May 7, 1935. H. F. VICKERS 2,000,265
VACUUM SYSTEM FOR HYDRAULICALLY OPERATED MECHANISMS
Filed March 30, 1931
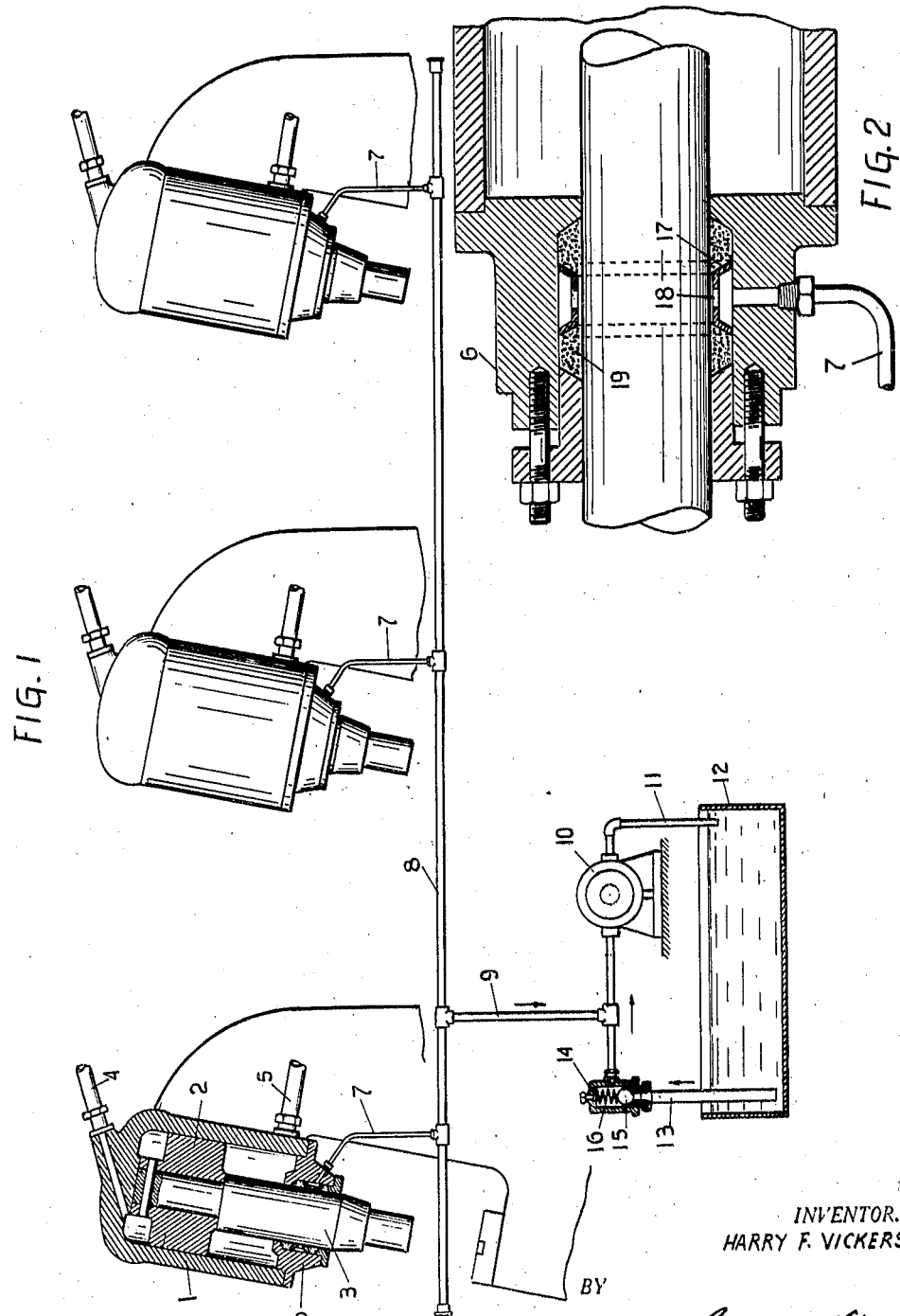
INVENTOR.
HARRY F. VICKERS
BY
Barnes & Kissell
ATTORNEYS Patented May 7, 1935

2,000,265

UNITED STATES PATENT OFFICE 2,000,265

VACUUM SYSTEM FOR HYDRAULICALLY
OPERATED MECHANISMS

Harry F. Vickers, Detroit, Mich.

Application March 30, 1931, Serial No. 526,192

2 Claims. (Cl. 137—78)

This invention relates to a vacuum system for hydraulically operated mechanism, and has to do particularly with means for preventing leakage and dripping of oil between relatively movable parts of hydraulically operated units.

Heretofore in the operation of hydraulic mechanisms such as presses and the like where a movable member such as a plunger is hydraulically moved through a stuffing box or the like, much difficulty has been experienced in the leakage and dripping of oil after the machine or unit has been in operation a comparatively short time. It is the object of the present invention to provide a simple means adapted to be connected to one or more hydraulic units for positively preventing any leakage or drippage between the movable member or members of such hydraulic unit or units.

More specifically, I have provided regulable vacuum creating means and suitable connections between such means and the stuffing box or similar unit surrounding the movable unit of a hydraulic mechanism. The result is that this constantly maintained vacuum will serve to positively withdraw any oil which should leak past the packing so that the movable unit, such as a ram or the like, will always be clean and free from any leakage or dripping of oil.

In the drawing:

Fig. 1 is a somewhat diagrammatic view illustrating the manner of connecting up the vacuum creating means with a plurality of hydraulically operated units, one of said units being shown partially in section to show the general assembly.

Fig. 2 is an enlarged detail view illustrating a manner of connecting the vacuum conduit to a standard stuffing box cylinder.

It will be understood that the present invention is adapted to be used with hydraulically operated mechanisms of practically every type. In order to best illustrate the invention I have shown the same as embodied in connection with hydraulic presses having what might be called a standard piston and cylinder construction.

In the left hand hydraulic unit of Fig. 1 I have shown a cylinder 1 having a piston 2 and a plunger or ram 3 forming a part of the press unit. The piston 2 is adapted to be operated hydraulically by means of operating fluid supplied through the conduits 4 and 5. It will be understood, of course, that any suitable arrangement or connections may be used for operating the piston as the present invention is not concerned with the type of fluid supply or the particular design of the member to be actuated.

The lower end of the cylinder 1 is shown as being provided with a standard stuffing box unit 6 and to this stuffing box unit is connected a small tube or conduit 7, preferably a small copper tube. This copper tube 7 may be connected to what might be termed a common line 8 and to this common line 8 is connected a vacuum conduit 9. A suitable pump 10 is connected to the conduit 9 and this pump is preferably one of a simple inexpensive type as it is adapted to be used primarily only for creating a vacuum.

In order to obtain the most efficient results the outlet of the pump 10 is connected by means of a suitable conduit 11 to a supply tank 12 holding a supply of oil or other suitable liquid. The intake of the pump 10 is connected to this tank 12 by means of a conduit 13 and somewhere between the intake of the conduit 13 and the intake of the pump 10 is provided a suction relief valve 14 adapted to regulably maintain a given vacuum. This suction relief valve may take various forms but roughly it is preferably provided with a suitable check valve 15 and a regulable spring 16 for controlling the opening thereof and hence the amount of vacuum maintained by the pump 10.

The stuffing box 6 may obviously take various forms but in Fig. 2 I have shown the conduit 7 as being connected centrally of an annular flanged ring 17. This ring 17 is preferably provided with a plurality of circumferentially spaced apertures 18 whereby to more effectively connect the vacuum line 7 with all the surfaces past which oil might be adapted to leak. The packing 19 may be considered important as it is adapted to keep air out of the stuffing box and hence out of the vacuum system.

The operation of the system is simple and quite obvious. The pump 10, through the medium of the suction relief valve 14, will serve to continuously maintain any degree of vacuum that might be desired. This vacuum is, of course, transmitted to the line 8 through the conduit 9 and the direct lead-ins 7 connect the stuffing boxes with this vacuum whereby the respective stuffing boxes will be maintained under a certain degree of vacuum to thus positively remove any oil or other fluid that might leak past the piston or operating member. While it is not important and does not form any particular part of the present invention, it will be understood that the tank 12 may be provided with any suitable overflow in case of an oversupply of leakage and, if desired, such over-flow may be conducted to the regular fluid circulating system.

What I claim is:

1. In a hydraulically operated mechanism of the type having a movable operating member, liquid supply means including a reservoir and a pump and liquid under pressure for operating said mechanism, a stuffing box, and a conduit leading from the interior of said stuffing box to a point between the reservoir and the pump, means for producing a positive suction in said stuffing box comprising a restrictive device positioned between the reservoir and the point of connection of said conduit whereby the pressure in the pipe leading into the pump is diminished relative to the pressure between the reservoir and said device.

2. In a hydraulically operated mechanism of the type having a movable operating member and cylinder, liquid supply means including a reservoir and a pump and liquid under pressure for operating said mechanism, a stuffing box for normally preventing leakage from said cylinder, and a conduit leading from the interior of said stuffing box to a point between the reservoir and the pump, means for producing and maintaining a positive suction in said conduit and stuffing box comprising a regulable restrictive device positioned between the reservoir and the point of connection of said conduit whereby the pressure in the pipe leading into the pump is diminished relative to the pressure between the reservoir and said device.

HARRY F. VICKERS.